(12) United States Patent
Qian et al.

(10) Patent No.: US 11,905,430 B2
(45) Date of Patent: Feb. 20, 2024

(54) LIGNOSULFONATE DISPERSION SELF-HEALING POLYUREA COATING, PREPARATION METHOD THEREFOR, COATING LAYER THEREOF AND APPLICATION THEREOF

(71) Applicant: South China University of Technology, Guangzhou (CN)

(72) Inventors: Yong Qian, Guangzhou (CN); Xueqing Qiu, Guangzhou (CN); Dongjie Yang, Guangzhou (CN); Hongming Lou, Guangzhou (CN); Weifeng Liu, Guangzhou (CN); Xinping Ouyang, Guangzhou (CN); Conghua Yi, Guangzhou (CN)

(73) Assignee: South China University of Technology, Guangzhou (CN)

( * ) Notice: Subject to any disclaimer, the term of this patent is extended or adjusted under 35 U.S.C. 154(b) by 898 days.

(21) Appl. No.: 16/959,695

(22) PCT Filed: Oct. 16, 2018

(86) PCT No.: PCT/CN2018/110449
§ 371 (c)(1),
(2) Date: Jul. 2, 2020

(87) PCT Pub. No.: WO2019/134416
PCT Pub. Date: Jul. 11, 2019

(65) Prior Publication Data
US 2020/0369912 A1    Nov. 26, 2020

(30) Foreign Application Priority Data
Jan. 3, 2018   (CN) .......................... 201810004406.5

(51) Int. Cl.
| C09D 175/02 | (2006.01) |
| C08G 18/64 | (2006.01) |
| C09D 5/08 | (2006.01) |
| C09D 197/00 | (2006.01) |

(52) U.S. Cl.
CPC ....... *C09D 175/02* (2013.01); *C08G 18/6492* (2013.01); *C09D 5/08* (2013.01); *C09D 197/005* (2013.01)

(58) Field of Classification Search
CPC ................ C08G 18/6492; C08G 18/10; C08G 18/5024; C08G 18/7664; C08G 18/724; C08G 18/73; C08G 18/755; C08G 18/7671; C08K 9/10; C09D 175/02; C09D 5/08; C09D 197/005; C09D 7/65
See application file for complete search history.

(56) References Cited

U.S. PATENT DOCUMENTS
| 4,280,833 A | 7/1981 | Beestman et al. |
| 4,417,916 A | 11/1983 | Beestman et al. |

FOREIGN PATENT DOCUMENTS
| CN | 85102011 A | 1/1987 |
| CN | 101125290 A | 2/2008 |
| CN | 101215408 A | 7/2008 |
| CN | 106943969 A | 7/2017 |
| CN | 107088389 A | 8/2017 |
| CN | 107312140 A | 11/2017 |
| CN | 107474615 A | 12/2017 |
| CN | 108219641 A | 6/2018 |

OTHER PUBLICATIONS

He Zhenglong, Preparation of Polyurea Microcapsules and Its Application on Self-Healing Materials, 1988.
International Search Report dated Jan. 9, 2019, Application No. PCT/CN2018/110449.

*Primary Examiner* — Anthony J Green
(74) *Attorney, Agent, or Firm* — The Dobrusin Law Firm, PC

(57) ABSTRACT

A lignosulfonate dispersion self-healing polyurea coating and a preparation method therefor. The coating is obtained by reacting the following components in parts by mass: 1-10 parts of microcapsules of a lignosulfonate-embedded healing agent; 10-100 parts a polyurea prepolymer; 20-120 parts of a mixed solution of an amino-terminated polyether and a sterically hindered amine chain extender. The preparation method for the coating comprises the steps of at room temperature, adding a mixed solution of microcapsules of a lignosulfonate-embedded healing agent, an amino-terminated polyether and a sterically hindered amine chain extender into a polyurea prepolymer and reacting same at room temperature for 10 min-4 h. The self-healing polyurea coating may be applied to the field of material surface protection, i.e., corrosion resistance of steel structures, especially marine steel structures.

9 Claims, 2 Drawing Sheets

LIGNOSULFONATE DISPERSION SELF-HEALING POLYUREA COATING, PREPARATION METHOD THEREFOR, COATING LAYER THEREOF AND APPLICATION THEREOF

TECHNICAL FIELD

The present invention belongs to the technical field of polymer materials, and in particular relates to a lignosulfonate dispersion self-healing polyurea coating, a preparation method therefor, a coating layer and application thereof.

BACKGROUND ART

The steel structure has a large number of applications in the construction of marine facilities, such as marine oil platforms, subsea pipelines, tunnels, and ships and other underwater parts. However, the marine atmospheric environment has a larger salt mist content, a higher humidity, and easily results in the formation of a corrosive water film on the steel surface with a strong corrosion effect; the corrosion rate of a steel exposed to long-term saturated sea fog air is 8 times that in the ordinary atmosphere. Therefore, the corrosion in the marine atmosphere has caused a greatly shortened service life of the steel structure, and doubled maintenance cost in the later period, so the steel structure must be protected.

Polyurea is a new and green corrosion resistance material for marine steel structures; compared with traditional corrosion resistance coating layers, the polyurea has the advantages of insensitivity to temperature, and humidity, chemical resistance, wear resistance, aging resistance, and good mechanical properties. The hardness and color of polyurea can be adjusted as needed; in addition, polyurea has its own strength that does not depend on the substrate, that is, polyurea can be used as a coating or as a lining. However, when squeezed and rubbed by external forces such as marine life, marine wastes, etc., the polyurea coating layer will generate cracks, and then seawater will infiltrate and erode the steel structure. The current improvement method for polyurea coating layer is to improve the performance of the polyurea coating by adjusting the ratio of soft and hard segments or using new components; another low-cost and effective method is to impart the polyurea coating layer with self-healing properties; when damaged, the coating layer can be automatically repaired to prevent the steel structure from coming into contact with the corrosive medium, thereby avoiding corrosion.

The self-healing materials have been widely used in the fields of military industry, satellites, aircrafts, electronics, etc. The self-healing of a material is generally achieved by a liquid core fiber method, a microcapsule method, dynamic chemical bonding and other forms, of which the microcapsule method is most commonly used. By dispersing microcapsules with a healing agent wrapped into the material, part of the microcapsules rupture under the action of an external force, the repairing agent flows out and penetrates into the cracks of the material, and will chemically react with a catalyst or other media to achieve healing. By means of microencapsulation, the physical properties of the healing agent, the stability of the healing agent, the controlled release, etc., can be improved. Currently, there are no reports on a self-healing coating layer of the self-healing polyurea, but only the preparation of a self-healing coating layer of a self-healing epoxy resin, using a polyurea as a wall material to prepare microcapsules and blending same with an epoxy resin. Yang et al., have prepared different polyurea microcapsules by 1,4-butanediol-initiated interfacial polymerization, with isophorone diisocyanate (IPDI) and prepolymers as healing agents, and studied the influence of rotation speed on the microcapsule size, the wall thickness and molecular weight (*Macromolecules,* 2008, 41, 9650-9655). Further, Huang et al., have obtain a self-healing coating layer by drying the prepared polyurea microcapsules and mixing same with an epoxy resin (*J. mater. Chem.* 2011, 21, 11123-11130). However, epoxy resins have poor flexibility and are prone to cracking under the external impact or alternating temperature changes, and the poor flexibility of the epoxy resins at a low temperature limits the application thereof in the corrosion resistance of marine steels. Therefore, it is extremely necessary to develop a high-performance self-healing polyurea coating layer.

Lignin sulfonate is a natural amphiphilic polymer surfactant, and contains active reactive groups such as a phenolic hydroxyl group and an alcoholic hydroxyl group. Therefore, in the present invention, the lignosulfonate is used to prepare a polyurea self-healing coating layer; the lignosulfonate can not only emulsify the healing agent, but also can react with the isocyanate component of polyurea to obtain a modified isocyanate component with microcapsules; the components are further reacted with an amino-terminated polyether and a chain extender to prepare the polyurea material with a self-healing function.

SUMMARY OF THE INVENTION

In order to overcome the above shortcomings and deficiencies of the prior art, a first object of the present invention is to provide a lignosulfonate dispersion self-healing polyurea coating.

Another object of the present invention is to provide a method for preparing the above lignosulfonate dispersion self-healing polyurea coating.

A still another object of the present invention is to provide a coating layer based on the above lignosulfonate dispersion self-healing polyurea coating.

A yet still another object of the present invention is to provide the use of the above lignosulfonate dispersion self-healing polyurea coating in the field of material surface protection.

The objectives of the present invention are achieved by the following schemes:

a lignosulfonate dispersion self-healing polyurea coating, which is obtained by reacting the following components in parts by mass: 1-10 parts of microcapsules of a lignosulfonate-embedded healing agent; 10-100 parts a polyurea prepolymer; 20-120 parts of a mixed solution of an amino-terminated polyether and a sterically hindered amine chain extender.

the microcapsule of the lignosulfonate-embedded healing agent is prepared by a method including the following steps: subjecting 10-100 parts by weight of an aqueous lignosulfonate solution and 1-50 parts by weight of a microcapsule healing agent formed of an aromatic isocyanate and an aliphatic isocyanate to mixing, emulsification, and drying at room temperature.

The mass ratio of the aromatic isocyanate to the aliphatic isocyanate is preferably 10:1-3:1.

The aromatic isocyanate is a highly reactive aromatic isocyanate.

The aliphatic isocyanate is a low reactive aliphatic isocyanate.

To further better achieve the object of the present invention, the weight ratio of the aqueous lignosulfonate solution to the microcapsule healing agent used therein is 10:1-1:0.4.

The mass concentration of the aqueous lignosulfonate solution is preferably 0.5-2%.

The emulsification is carried out under high-speed shearing, at a shearing speed of preferably 6000-11000 rpm/min.

The emulsification time is preferably 30 s-3 min.

Further, the microcapsule of the lignosulfonate-embedded healing agent is prepared by a method including the following steps: mixing 10-100 parts by weight of an aqueous lignosulfonate solution with 1-50 parts by weight of a microcapsule healing agent formed of an aromatic isocyanate and an aliphatic isocyanate, emulsifying under high-speed shearing conditions of 3000-25000 rpm/min for 5 s-10 min to obtain an O/W pickering emulsion, and drying same at room temperature to obtain microcapsules of the lignosulfonate-embedded healing agent.

The polyurea prepolymer is prepared by a method including the following steps: mixing an amino-terminated polyether with an aliphatic isocyanate at a molar ratio of 0.5:1-2:1, increasing the temperature to 20° C.-100° C., and reacting same under stirring for 10 min-24 h.

The molar ratio of the amino-terminated polyether to the aliphatic isocyanate is preferably 1:1-1.5:1.

The temperature increase is preferably a temperature increase to 35-75° C.

In the mixed solution of the amino-terminated polyether and the sterically hindered amine chain extender, the molar ratio of the amino-terminated polyether to the sterically hindered amine chain extender is preferably 0.5:0.1-2:0.1, more preferably 0.5:0.1-1:0.1.

In the coating of the present invention, the lignosulfonate includes one or more of bamboo pulp lignosulfonate, wheat straw pulp lignosulfonate, reed lignosulfonate, bagasse pulp lignosulfonate, eulaliopsis binata pulp lignosulfonate, cotton pulp lignosulfonate, etc.; sulfonation products of industrial lignins (including alkali lignins, solvent-based lignins, enzymatic lignins, etc.) and sulfomethylation products of industrial lignins.

the aromatic isocyanate includes one or more of toluene diisocyanate (TDI), diphenylmethane diisocyanate (MDI), polymerized diphenylmethane diisocyanate (PMDI), and polymethylene polyphenyl polyisocyanate (PAPI).

The aliphatic isocyanate includes one or more of isophorone diisocyanate (IPDI), hexamethylene diisocyanate (HDI), an HDI trimer, etc.

the amino-terminated polyether includes one or more of polyetheramine D230, polyetheramine D400, polyetheramine D2000, etc.

the sterically hindered amine chain extender includes one or more of a 3,5-diamino-4-chlorobenzoic acid isobutanol ester, diacetyl ethylenediamine, diacetyl m-phenylenediamine, 4,4-diacetylamino diphenylmethane, diethyltoluenediamine, etc.

The present invention also provides a method for preparing the above lignosulfonate dispersion self-healing polyurea coating, comprising the following steps: at room temperature, adding a mixed solution of microcapsules of a lignosulfonate-embedded healing agent, an amino-terminated polyether and a sterically hindered amine chain extender into a polyurea prepolymer and reacting same at room temperature for 10 min-4 h to obtain the lignosulfonate dispersion self-healing polyurea coating.

The reaction time is preferably 30 min-2 h.

In the present invention, the microcapsules of lignosulfonate-embedded healing agent are obtained by allowing the amino-terminated polyether, as an amino component to participate the reaction, and reacting a microcapsule healing agent formed of a highly reactive aromatic isocyanate and a low reactive aliphatic isocyanate with lignosulfonate.

The present invention also provides a coating layer based on the above-mentioned lignosulfonate dispersion self-healing polyurea coating; the coating of the present invention is mixed according to the above preparation method, applied on the surface of the substrate, and then reacted to obtain the lignosulfonate dispersion self-healing polyurea coating. In the coating layer of the present invention, the particle size of the lignosulfonate-embedded healing agent microcapsules is 30-90 μm, with IPDI and PMDI wrapped inside, and the thickness of the polyurea coating layer is 230-500 μm.

The lignosulfonate dispersion self-healing polyurea coating of the present invention overcomes the problem that the polyurea coating layer is difficult to be repaired after stress damage, and can be better applied to the corrosion resistance of steel structures, and can be used in the field of material surface protection and has a bright prospect in the application of marine steel structure materials.

The mechanism of the present invention is:

the self-healing mechanism of the coating of the present invention is a microcapsule method, where a lignosulfonate, as a dispersant, wraps a highly reactive aromatic isocyanate and a low reactive aliphatic isocyanate to form a microcapsule healing agent, and the surface lignosulfonate is reacted with the aliphatic isocyanate to form an isocyanate component containing lignin-based healing agent microcapsules, and the isocyanate component is reacted with an amino component to form a polyurea coating layer containing lignin-based healing agent microcapsules. Under the action of an external force, the microcapsules are scratched or squeezed, and the healing agent inside is reacted with the water in the air or the excess amino component in the polyurea coating layer, thereby having a self-healing function.

The lignosulfonate contains both hydrophilic groups such as sulfonic acid groups, as well as active reaction sites such as phenolic hydroxyl groups and alcoholic hydroxyl groups; in the present invention, lignosulfonate is dispersed and dissolved in water, with the oil phase being the highly reactive aromatic isocyanate and the low reactive aliphatic isocyanate, forming a microcapsule healing agent; under high-speed shearing, the lignosulfonate disperses the oil phase to form an O/W Pickering emulsion. The phenolic hydroxyl group and the alcoholic hydroxyl group in the sodium lignosulfonate molecules of the outer layer of the emulsion droplets wrapping the healing agent can be reacted with the aliphatic isocyanate to form an isocyanate component. The isocyanate component is reacted with the amino component to form a polyurea coating containing microcapsules of a lignin-based healing agent. In the present invention, a self-healing polyurea coating is obtained by incorporating microcapsules of a lignosulfonate-embedded healing agent into the polyurea coating layer, and the preparation of the self-healing polyurea coating expands the application of the lignin in polymer materials, and at the same time, overcomes the problem that the polyurea coating layer is difficult to be repaired after stress damage, and can be better applied to the corrosion resistance of steel structures, and can be used in the field of material surface protection and has a bright prospect in the application of marine steel structure materials.

Compared with the prior art, the present invention has the following advantages and beneficial effects:

1. the industrial lignin with an abundant source and a low price is directly used as the raw material, dispersed in water without additional emulsifier and cross-linking agent; the lignosulfonate-embedded healing agent microcapsules are prepared by a one-step method; the preparation process is simple and the process is green and environmentally friendly, and the present invention has low cost. At the same time, the phenolic hydroxyl structure with ultraviolet absorption in the lignin is retained.

2. In the present invention, amphiphilic lignosulfonate with a good dispersibility is used, and the reactivity of hydroxyl group in the lignin is beneficial for the subsequent preparation of the self-healing coating layer.

3. The lignin used in the present invention is derived from plants, and the structure of the natural polymer enables a good light stability; as a wall material, the lignin can not only improve the stability of the microcapsules, but also be applied to the coating layer to reduce the degradation of the material by sunlight radiation.

4. In the present invention, the microcapsules with a healing agent wrapped are incorporated into the polyurea coating layer; compared with the polyurea coating layer without adding microcapsules, the present invention has obvious corrosion resistance and significantly prolonged service life of a steel sheet. On the basis that the polyurea coating itself has the characteristics of good flexibility, high strength, corrosion resistance, and aging resistance, the polyurea coating layer is given self-healing properties, such the advantages of the polyurea coating layer can be well developed. Therefore, polyurea coating layer has a bright application prospect and market potential in marine steel structure materials.

DETAILED DESCRIPTION OF EMBODIMENTS

The present invention will be further described in detail below in conjunction with embodiments, but this does not limit the implementation of the present invention.

The materials involved in the following examples are all available from commercial sources.

Example 1

(1) 10 g of a 2% wheat straw pulp lignosulfonate is added into a 30 mL white lid glass sample bottle, and then 0.5 g of PMDI and 2.5 g of IPDI are add into the sample bottle after uniformly mixing; they are mechanically emulsified for 3 min at a speed of 11000 rpm/min, to obtain an O/W pickering emulsion for use.

(2) At room temperature, 0.01 mol of amino-terminated polyether D-2000 and 0.012 mol HDI are added into a 150 mL beaker, heated to 75° C. in a water bath at a constant temperature rate (5° C./min), reacted under mechanical stirring at 300 rpm for 1 hour, to obtain a viscous and transparent HDI prepolymer, and the prepolymer is cooled at room temperature.

(3) At room temperature, after the emulsion in step (1) is added into the prepolymer in step (2), 0.001 mol of a sterically hindered amine chain extender dissolved in 1 mL of toluene and 0.05 mol of amino-terminated polyether D-2000 are added, and reacted under mechanical stirring at 300 rpm for 1 hour.

(4) A steel sheet is polished with a sandpaper, rinsed with acetone and dried. The compound of step (3) is applied to the steel sheet with an I-shaped coater, with the coating layer being 500 μm thick; after having been left at room temperature for 24 hours, the corrosion resistance test is performed.

(5) Anti-erosion test: the steel sheet is scratched by a razor blade on the surface and placed into a 10% NaCl aqueous solution for 48 hours.

Figure 1:
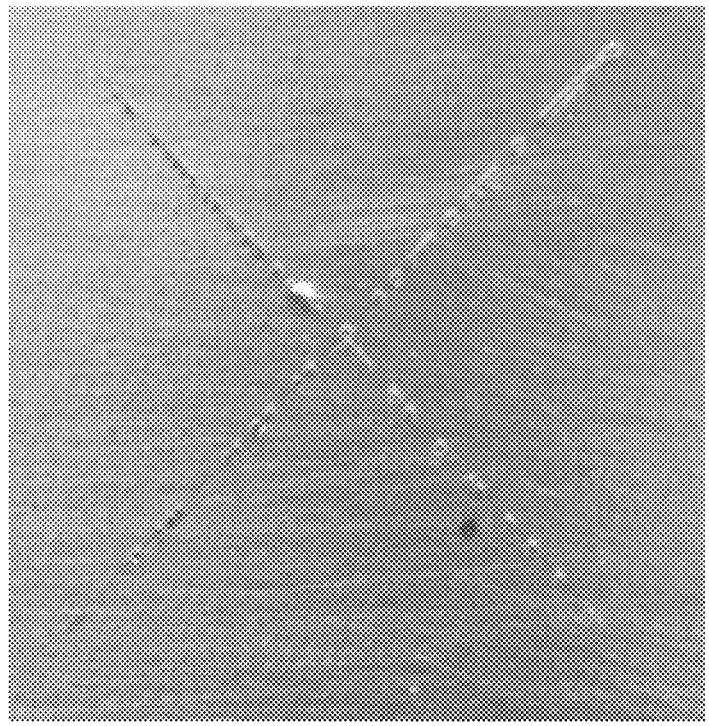
FIG. 1 is a photograph of the anti-erosion of the self-healing polyurea coating layer of Example 1.
Figure 2:
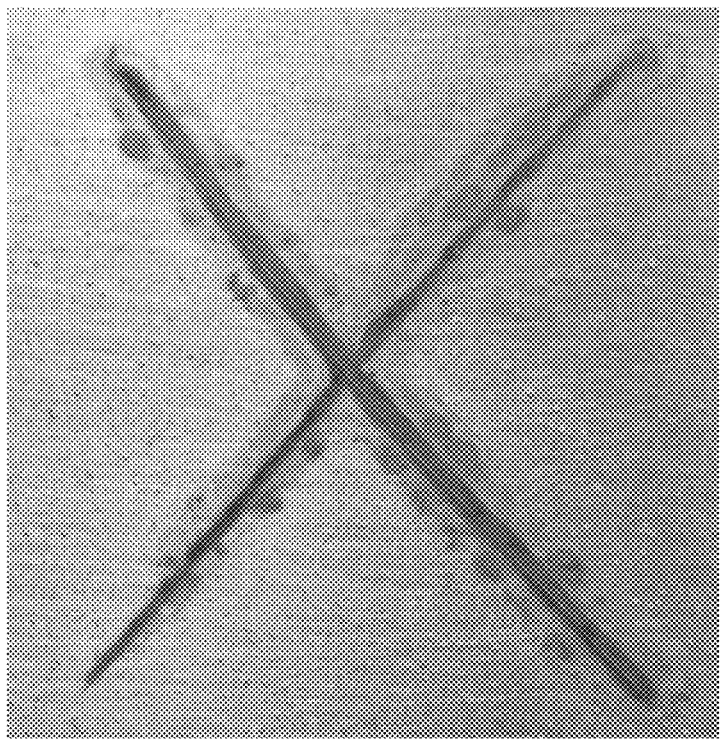
FIG. 2 is a photograph of the anti-erosion of an ordinary polyurea coating layer.
Figure 3:
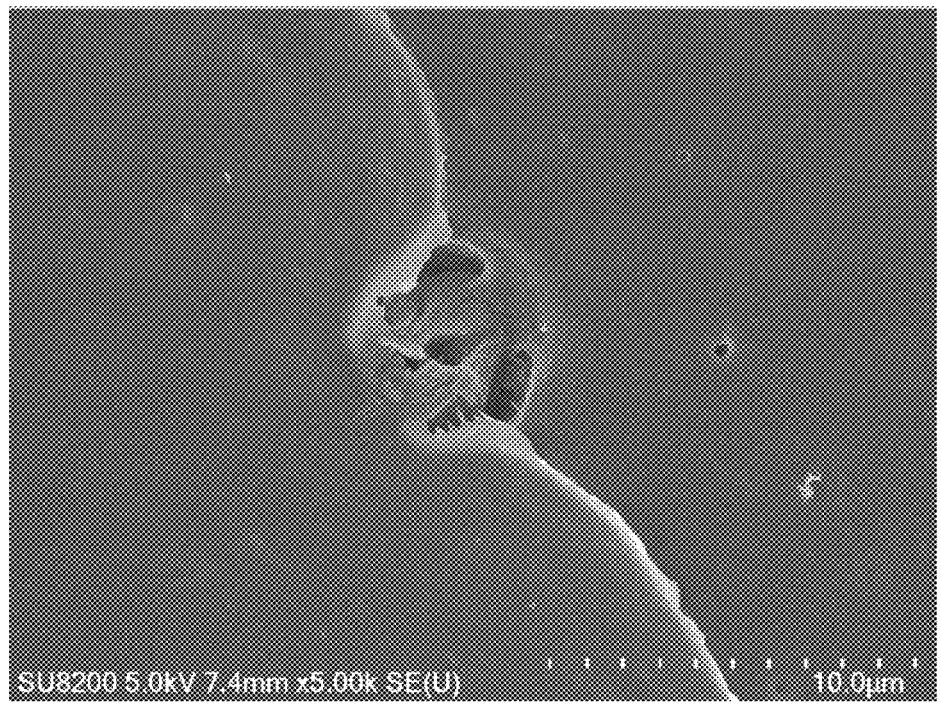
FIGS. 3 and 4 are scanning electron micrographs of the self-healing polyurea coating layer of Example 1.
Figure 4:
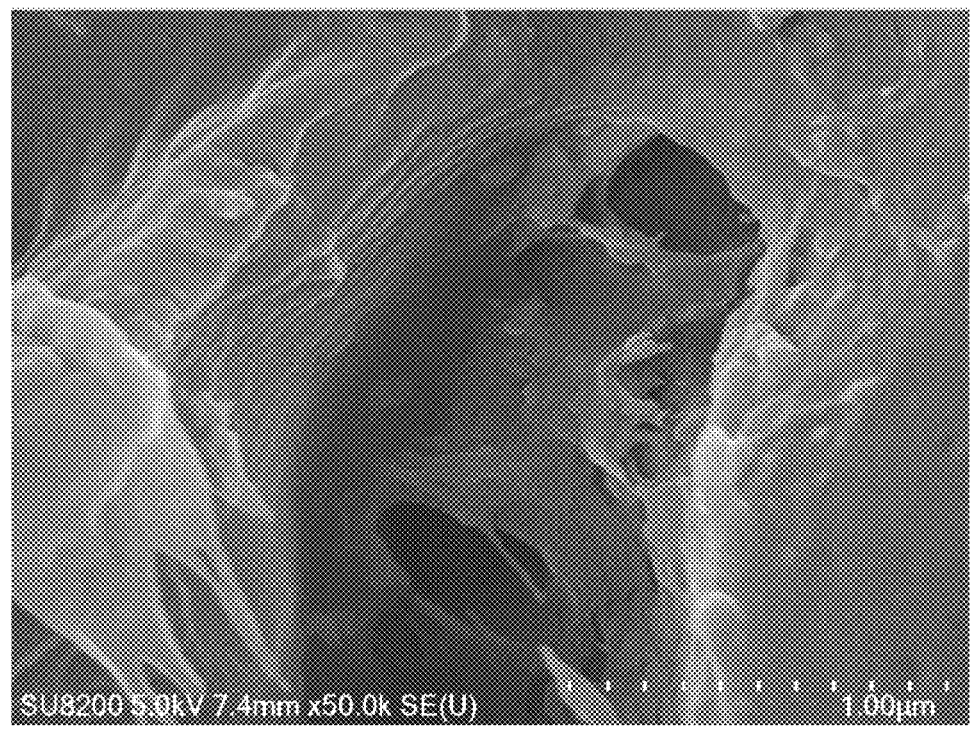

The tested coating is shown in the figure; FIG. 1 is a self-healing polyurea coating layer with microcapsules of the present invention, and FIG. 2 is a polyurea coating layer without microcapsules. It can be seen that the ordinary polyurea coating layer has obvious rust on the scratches, but the self-healing polyurea coating layer of the present invention does not have such signs. In addition, the scanning electron micrographs of the self-healing coating layers in FIGS. 3 and 4 also indicate that the microcapsules rupture and then react with water or excess amino-terminated polyether to form a new coating layer.

Example 2

(1) 6 g of a 0.5% wheat straw pulp lignosulfonate is added into a 30 mL white lid glass sample bottle, and then 1 g of MDI and 5 g of IPDI are add into the sample bottle after uniformly mixing; they are mechanically emulsified for 30 s at a speed of 11000 rpm/min, to obtain an O/W pickering emulsion.

(2) At room temperature, 0.01 mol of amino-terminated polyether D-2000 and 0.012 mol HDI are added into a 150 mL beaker, heated to 45° C. in a water bath at a constant temperature rate (5° C./min), reacted under mechanical stirring at 200 rpm for 1.5 hour, to obtain a viscous and transparent HDI prepolymer, and the prepolymer is cooled at room temperature.

(3) At room temperature, after the emulsion in step (1) is added into the prepolymer in step (2), 0.001 mol of a sterically hindered amine chain extender dissolved in 1 mL of toluene and 0.05 mol of amino-terminated polyether D-2000 are added, and reacted under mechanical stirring at 200 rpm for 30 min.

(4) A steel sheet is polished with a sandpaper, rinsed with acetone and dried. The compound of step (3) is applied to the steel sheet with an I-shaped coater, with the coating layer being 500 μm thick; after having been left at room temperature for 24 hours, the corrosion resistance test is performed.

(5) Anti-erosion test: the steel sheet is scratched by a razor blade on the surface and placed into a 10% NaCl aqueous solution for 48 hours. It is observed that there are no obvious rust marks at the scratches.

Example 3

(1) 4 g of a 1% bamboo pulp lignosulfonate is added into a 30 mL white lid glass sample bottle, and then 0.5 g of PMDI and 0.5 g of IPDI are add into the sample bottle after uniformly mixing; they are mechanically emulsified for 30 s at a speed of 11000 rpm/min, to obtain an O/W pickering emulsion.

(2) At room temperature, 0.01 mol of amino-terminated polyether D-2000 and 0.012 mol HDI are added into a 150 mL beaker, heated to 60° C. in a water bath at a constant temperature rate (5° C./min), reacted under mechanical stirring at 300 rpm for 1 hour, to obtain a viscous and transparent HDI prepolymer, and the prepolymer is cooled at room temperature.

(3) At room temperature, after the emulsion in step (1) is added into the prepolymer in step (2), 0.001 mol of a sterically hindered amine chain extender dissolved in 1 mL of toluene and 0.05 mol of amino-terminated polyether D-2000 are added, and reacted under mechanical stirring at 300 rpm for 40 min.

(4) A steel sheet is polished with a sandpaper, rinsed with acetone and dried. The compound of step (3) is applied to the steel sheet with an I-shaped coater, with the coating layer being 500 μm thick; after having been left at room temperature for 24 hours, the corrosion resistance test is performed.

(5) Anti-erosion test: the steel sheet is scratched by a razor blade on the surface and placed into a 10% NaCl aqueous solution for 48 hours. It is observed that there are no obvious rust marks at the scratches.

Example 4

(1) 6 g of a 1% bamboo pulp lignosulfonate is added into a 30 mL white lid glass sample bottle, and then 4 g of PMDI and 1 g of IPDI are add into the sample bottle after uniformly mixing; they are mechanically emulsified for 30 s at a speed of 11000 rpm/min, to obtain an O/W pickering emulsion.

(2) At room temperature, 0.02 mol of amino-terminated polyether D-400 and 0.03 mol HDI are added into a 150 mL beaker, heated to 65° C. in a water bath at a constant temperature rate (5° C./min), reacted under mechanical stirring at 300 rpm for 1 hour, to obtain a viscous and transparent HDI prepolymer, and the prepolymer is cooled at room temperature.

(3) At room temperature, after the emulsion in step (1) is added into the prepolymer in step (2), 0.005 mol of a sterically hindered amine chain extender dissolved in 1 mL of toluene and 0.01 mol of amino-terminated polyether D-2000 are added, and reacted under mechanical stirring at 300 rpm for 40 min.

(4) A steel sheet is polished with a sandpaper, rinsed with acetone and dried. The compound of step (3) is applied to the steel sheet with an I-shaped coater, with the coating layer being 500 μm thick; after having been left at room temperature for 24 hours, the corrosion resistance test is performed.

(5) Anti-erosion test: the steel sheet is scratched by a razor blade on the surface and placed into a 10% NaCl aqueous solution for 48 hours. It is observed that there are no obvious rust marks at the scratches.

Example 5

(1) 5 g of a 1% reed lignosulfonate is added into a 30 mL white lid glass sample bottle, and then 4 g of PMDI and 1 g of IPDI are add into the sample bottle after uniformly mixing; they are mechanically emulsified for 20 s at a speed of 11000 rpm/min, to obtain an O/W pickering emulsion.

(2) At room temperature, 0.01 mol of amino-terminated polyether D-2000 and 0.015 mol HDI are added into a 150 mL beaker, heated to 70° C. in a water bath at a constant temperature rate (5° C./min), reacted under mechanical stirring at 300 rpm for 1 hour, to obtain a viscous and transparent HDI prepolymer, and the prepolymer is cooled at room temperature.

(3) At room temperature, after the emulsion in step (1) is added into the prepolymer in step (2), 0.005 mol of a sterically hindered amine chain extender dissolved in 1 mL of toluene and 0.05 mol of amino-terminated polyether D-2000 are added, and reacted under mechanical stirring at 300 rpm for 30 min.

(4) A steel sheet is polished with a sandpaper, rinsed with acetone and dried. The compound of step (3) is applied to the steel sheet with an I-shaped coater, with the coating layer being 500 μm thick; after having been left at room temperature for 24 hours, the corrosion resistance test is performed.

(5) Anti-erosion test: the steel sheet is scratched by a razor blade on the surface and placed into a 10% NaCl aqueous solution for 48 hours. It is observed that there are no obvious rust marks at the scratches.

Example 6

(1) 5 g of a 1% reed lignosulfonate is added into a 30 mL white lid glass sample bottle, and then 4 g of MDI and 1 g of IPDI are add into the sample bottle after uniformly mixing; they are mechanically emulsified for 30 s at a speed of 11000 rpm/min, to obtain an O/W pickering emulsion.

(2) At room temperature, 0.01 mol of amino-terminated polyether D-2000 and 0.012 mol HDI are added into a 150 mL beaker, heated to 70° C. in a water bath at a constant temperature rate (5° C./min), reacted under mechanical stirring at 300 rpm for 1 hour, to obtain a viscous and transparent HDI prepolymer, and the prepolymer is cooled at room temperature.

(3) At room temperature, after the emulsion in step (1) is added into the prepolymer in step (2) and reacted for 30 min, 0.001 mol of a sterically hindered amine chain extender dissolved in 1 mL of toluene and 0.005 mol of amino-terminated polyether D-2000 are added, and reacted under mechanical stirring at 300 rpm for 1 hour.

(4) A steel sheet is polished with a sandpaper, rinsed with acetone and dried. The compound of step (3) is applied to the steel sheet with an I-shaped coater, with the coating layer being 300 μm thick; after having been left at room temperature for 24 hours, the corrosion resistance test is performed.

(5) Anti-erosion test: the steel sheet is scratched by a razor blade on the surface and placed into a 10% NaCl aqueous solution for 48 hours. It is observed that there are no obvious rust marks at the scratches.

Example 7

(1) 6 g of a 1% bagasse pulp lignosulfonate is added into a 30 mL white lid glass sample bottle, and then 3 g of PMDI and 1 g of IPDI are add into the sample bottle after uniformly mixing; they are mechanically emulsified for 30 s at a speed of 11000 rpm/min, to obtain an O/W pickering emulsion.

(2) At room temperature, 0.01 mol of amino-terminated polyether D-2000 and 0.012 mol HDI are added into a 150 mL beaker, heated to 70° C. in a water bath at a constant temperature rate (5° C./min), reacted under mechanical stirring at 300 rpm for 1 hour, to obtain a viscous and transparent HDI prepolymer, and the prepolymer is cooled at room temperature.

(3) At room temperature, after the emulsion in step (1) is added into the prepolymer in step (2) and reacted for 30 min, 0.001 mol of a sterically hindered amine chain extender dissolved in 1 mL of toluene and 0.002 mol of amino-terminated polyether D-2000 are added, and reacted under mechanical stirring at 300 rpm for 1 hour.

(4) A steel sheet is polished with a sandpaper, rinsed with acetone and dried. The compound of step (3) is applied to the steel sheet with an I-shaped coater, with the coating layer being 300 μm thick; after having been left at room temperature for 24 hours, the corrosion resistance test is performed.

(5) Anti-erosion test: the steel sheet is scratched by a razor blade on the surface and placed into a 10% NaCl aqueous solution for 48 hours. It is observed that there are no obvious rust marks at the scratches.

The above examples are preferred implementations of the present invention. However, the implementation of the present invention is not limited by the above examples, and any alternation, modification, substitution, combination and simplification without departing from the spiritual essence and principles of the present invention should all be equivalent replacements, and all fall within the scope of protection of the present invention.

The invention claimed is:

1. A lignosulfonate dispersion self-healing polyurea coating composition, wherein it is obtained by reacting the following components in parts by mass: 1-10 parts of microcapsules of a lignosulfonate-embedded healing agent; 10-100 parts a polyurea prepolymer; 20-120 parts of a mixed solution of an amino-terminated polyether and a sterically hindered amine chain extender.

2. A lignosulfonate dispersion self-healing polyurea coating composition according to claim 1, wherein the microcapsule of the lignosulfonate-embedded healing agent is prepared by a method including the following steps: subjecting 10-100 parts by weight of an aqueous lignosulfonate solution and 1-50 parts by weight of a microcapsule healing agent formed of an aromatic isocyanate and an aliphatic isocyanate to mixing, emulsification, and drying at room temperature.

3. A lignosulfonate dispersion self-healing polyurea coating composition according to claim 2, wherein the mass ratio of the aromatic isocyanate to the aliphatic isocyanate is 10:1-3:1; the weight ratio of the aqueous lignosulfonate solution to the microcapsule healing agent used therein is 10:1-1:0.4; the mass concentration of the aqueous lignosulfonate solution is 0.5-2%; the emulsification is carried out under high-speed shearing, at a shearing speed of 6000-11000 rpm/min; the emulsification time is 30 s-3 min.

4. A lignosulfonate dispersion self-healing polyurea coating composition according to claim 1, wherein the polyurea prepolymer is prepared by a method including the following steps: mixing an amino-terminated polyether with an aliphatic isocyanate at a molar ratio of 0.5:1-2:1, increasing the temperature to 20° C.-100° C., and reacting same under stirring for 10 min-24 h.

5. A lignosulfonate dispersion self-healing polyurea coating composition according to claim 4, wherein the molar ratio of the amino-terminated polyether to the aliphatic isocyanate is 1:1-1.5:1; the temperature increase is a temperature increase to 35-75° C.

6. A lignosulfonate dispersion self-healing polyurea coating composition according to claim 1, wherein in the mixed solution of the amino-terminated polyether and the sterically hindered amine chain extender, the molar ratio of the amino-terminated polyether to the sterically hindered amine chain extender is 0.5:0.1-2:0.1.

7. A lignosulfonate dispersion self-healing polyurea coating composition according to claim 1, wherein the lignosulfonate includes one or more of bamboo pulp lignosulfonate, wheat straw pulp lignosulfonate, reed lignosulfonate, bagasse pulp lignosulfonate, eulaliopsis binata pulp lignosulfonate, cotton pulp lignosulfonate, industrial lignin sulfonation products and industrial lignin sulfomethylation products;

the aromatic isocyanate includes one or more of toluene diisocyanate, diphenylmethane diisocyanate, polymerized diphenylmethane diisocyanate, and polymethylene polyphenyl polyisocyanate;

the aliphatic isocyanate includes one or more of isophorone diisocyanate, hexamethylene diisocyanate, and a hexamethylene diisocyanate trimer;

the amino-terminated polyether includes one or more of polyetheramine D230, polyetheramine D400, and polyetheramine D2000;

the sterically hindered amine chain extender includes one or more of a 3,5-diamino-4-chlorobenzoic acid isobutanol ester, diacetyl ethylenediamine, diacetyl m-phenylenediamine, 4,4-diacetylamino diphenylmethane and diethyltoluenediamine.

8. A method for preparing a lignosulfonate dispersion self-healing polyurea coating composition according to claim 1, wherein it comprises the following steps: at room temperature, adding a mixed solution of microcapsules of a lignosulfonate-embedded healing agent, an amino-terminated polyether and a sterically hindered amine chain extender into a polyurea prepolymer and reacting same at room temperature for 10 min-4 h to obtain the lignosulfonate dispersion self-healing polyurea coating composition.

9. A coating layer comprising:
a lignosulfonate dispersion self-healing polyurea coating composition, wherein it is obtained by reacting the following components in parts by mass: 1-10 parts of microcapsules of a lignosulfonate-embedded healing agent; 10-100 parts a polyurea prepolymer; 20-120 parts of a mixed solution of an amino-terminated polyether and a sterically hindered amine chain extender.

* * * * *